United States Patent

Chen et al.

[11] Patent Number: 5,932,664
[45] Date of Patent: Aug. 3, 1999

[54] PROCESS FOR THE PRODUCTION OF HYDROGENATED RING-OPENED METATHESIS POLYMERS

[75] Inventors: Yun Chen, Krefeld; Ralf Dujardin, Willich; Harald Pielartzik, Krefeld, all of Germany; Uli Werner Franz, Moon Township, Pa.

[73] Assignee: Bayer AG, Leverkusen, Germany

[21] Appl. No.: 08/991,721

[22] Filed: Dec. 16, 1997

[30] Foreign Application Priority Data

Dec. 23, 1996 [DE] Germany ............. 196 54 074

[51] Int. Cl.$^6$ ..................... C08F 8/04
[52] U.S. Cl. .............. 525/338; 525/332.1; 525/339
[58] Field of Search ................ 525/338, 339

[56] References Cited

U.S. PATENT DOCUMENTS

| | | | |
|---|---|---|---|
| 5,266,665 | 11/1993 | Hardiman | 526/117 |
| 5,312,940 | 5/1994 | Grubbs et al. | 556/136 |
| 5,342,909 | 8/1994 | Grubbs et al. | 526/171 |

FOREIGN PATENT DOCUMENTS

| | | |
|---|---|---|
| 0 002 277 | 6/1979 | European Pat. Off. . |
| 0 303 246 | 2/1989 | European Pat. Off. . |
| 0 317 262 | 5/1989 | European Pat. Off. . |
| 41 39 476 | 6/1992 | Germany . |
| WO 95/33786 | 12/1995 | WIPO . |

OTHER PUBLICATIONS

Orbit Abstract of DE 41 39 476 (Jun. 4, 1992).
Benedicto et al., *Microstructural Studies of Poly(7–oxabicyclo[2.2.1]hept–2–ene) Derivatives Prepared from Selective Ruthenium Catalysts,* Macromolecules, Bd. 25, Nr. 22, 1992, 5893–5900 (Oct. 26, 1992).
Patent Abstracts of Japan, vol. 14, No. 106 (C–0694), Abstract of JP 01 311120 (Japan Synthetic Rubber Co Ltd), Dec. 15, 1989.

Primary Examiner—Bernard Lipman
Attorney, Agent, or Firm—Connolly & Hutz

[57] ABSTRACT

Process for the production of hydrogenated, ring-opened metathesis (co)polymers from cyclic olefins using the ruthenium-carbene complexes of the general formula (I)

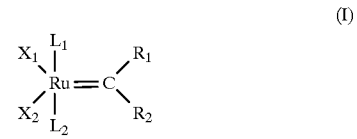

in which $R_1$ and $R_2$ mutually independently mean hydrogen, $C_2$–$C_{20}$ alkenyl, $C_1$–$C_{20}$ alkyl, aryl, $C_1$–$C_{20}$ carboxylate, $C_1$–$C_{20}$ alkoxy, $C_2$–$C_{20}$ alkenyloxy, aryloxy, $C_2$–$C_{20}$ alkoxycarbon-yl, $C_1$–$C_{20}$ alkylthio, which may optionally be substituted by $C_1$–$C_5$ alkyl, halogen, $C_1$–$C_5$ alkoxy or by phenyl optionally substituted by $C_1$–$C_5$ alkyl, halogen, $C_1$–$C_5$ alkoxy;

$X_1$ and $X_2$ mutually independently mean any desired anionic ligand;

$L_1$ and $L_2$ mutually independently mean any desired neutral electron donor and two or three of $X_1$, $X_2$, $L_1$ and $L_2$ may furthermore together form a multi-dentate chelating ligand, as catalysts for the polymerisation stage, wherein the catalyst is optionally modified after polymerisation by adding a modifier and the polymerisation product is hydrogenated as a solution (optionally diluted with the same inert solvent as during polymerisation or with another inert solvent) without addition of an extra hydrogenation catalyst at temperatures of 0° C. to 200° C. preferably of 35° C. to 150° C. under a hydrogen pressure of 2 to 200 bar, preferably of 10 to 50 bar, wherein at least 60%, preferably at least 95% of the olefinic double bonds are saturated.

5 Claims, No Drawings

PROCESS FOR THE PRODUCTION OF HYDROGENATED RING-OPENED METATHESIS POLYMERS

The present invention relates to a process for the production of hydrogenated ring-opened metathesis polymers (ROMP polymers). The materials obtainable from this process exhibit particularly elevated purity and good thermal and light stability. Most of the hydrogenated ring-opened metathesis polymers prepared from norbornene or tetracyclododecene derivatives are amorphous thermoplastic polymers having large application potential.

Ring-opened metathesis polymers prepared from ring-stressed cycloolefins, such as for ex ample norbornene derivatives, tetracyclododecene derivatives are known (for example from EP-A 002 277). However, due to the carbon-carbon double bonds in the polymer backbone, they are thermally and photochemically unstable. A requirement thus arose to hydrogenate such unsaturated polymers either entirely or partially, depending upon their intended application.

Hydrogenated products of polymers from ring-opening metathesis polymerisation (ROMP) are also known. EP-317 262 and DE 41 39 476 describe hydrogenated ROMP polymers prepared from tetracyclododecene derivatives having an ester group, for example 7-methyl-7-methoxycarbonyltetracyclododecene. The stated monomer was sub-jected to ring-opening polymerisation with catalysis by tungsten hexachloride, modified by paraldehyde, in the presence of triisobutylaluminium or diethylaluminium chloride. The resultant polymer was then hydrogenated under pressurised hydrogen, wherein nickel naphthenate, rhodium on carbon, palladium on diatomaceous earth, $RuHCl(CO)(PPh_3)_3$ etc. may be used as the hydrogenation catalyst. EP-303 246 describes, for example, the ring-opening copolymerisation of dicyclopentadiene and methyltetracyclododecene with catalysis by molybdenum pentachloride in the presence of ethylaluminium sesquichloride. The resultant polymer was hydrogenated with catalysis by nickel on aluminium oxide.

The polymerisation and hydrogenation processes described in the prior art use poly merisation catalysts in two or more components and an additional hydrogenation catalyst. Catalyst residues accumulate in the product. These catalyst residues may contain metal residues (W, Ti, Mo, Re, Ru, Al etc.), halogen, phosphorus, silicon etc., which severely impair polymer properties, such as for example transparency, stability, processability. This increases purification requirements after polymer synthesis.

The object thus arose of providing a process wherein only one single catalyst containing metal and having elevated polymerisation and hydrogenation activity is added for the pro-duction of hydrogenated ROMP polymers.

U.S. Pat. No. 5,312,940 and U.S. Pat. No. 5,342,909 describe inter alia the ruthenium-carbene complexes of the general formula (I)

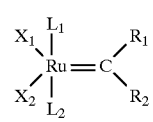

(I)

in which $R_1$ and $R_2$ mutually independently mean hydrogen, $C_2$–$C_{20}$ alkenyl, $C_1$–$C_{20}$ alky, aryl, $C_1$–$C_{20}$ carboxylate, $C_1$–$C_{20}$ alkoxy, $C_2$–$C_{20}$ alkenyloxy, aryloxy, $C_2$–$C_{20}$ alkoxycar-bonyl, $C_1$–$C_{20}$ alkylthio, which may optionally be substituted by $C_{1-C5}$ alkyl, halogen, $C_1$–$C_5$ alkoxy or by phenyl optionally substituted by $C_1$–$C_5$ alkyl, halogen, $C_1$–$C_5$ alkoxy;

$X_1$ and $X_2$ mutually independently mean any desired anionic ligand;

$L_1$ and $L_2$ mutually independently mean any desired neutral electron donor and two or three of $X_1$, $X_2$, $L_1$ and $L_2$ may furthermore together form a multidentate chelating ligand, and the use thereof as catalysts for ring-opening metathesis polymerisation of cyclic olefins.

The present invention provides a process for the production of hydrogenated, ring-opened metathesis (co)polymers from cyclic olefins using the above-stated ruthenium-carbene complexes as catalysts for the polymerisation stage, characterised in that the catalyst is optionally modified after polymerisation by adding a modifier and the polymerisation product is hydrogenated as a solution (optionally diluted with the same inert solvent as during polymerisation or with another inert solvent) without addition of an extra hydrogenation catalyst at temperatures of 0° C. to 200° C., preferably of 35° C. to 150° C. under a hydrogen pressure of 2 to 200 bar, preferably of 10 to 50 bar, wherein at least 60%, preferably at least 95% of the olefinic double bonds are saturated.

Preferred catalysts are the ruthenium-carbene complexes of the general formula (I)

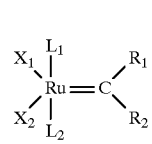

(I)

$R_1$ and $R_2$ mutually independently mean hydrogen, $C_2$–$C_5$ alkenyl, $C_1$–$C_5$ alkyl, phenyl, $C_1$–$C_5$ carboxylate, $C_1$–C5 alkoxy, phenoxy, $C_2$–$C_5$ alkoxycarbonyl, which may optionally be substituted by $C_1$–$C_5$ alkyl, halogen, $C_1$–$C_5$ alkoxy or optionally by phenyl substituted by $C_1$–$C_5$ alkyl, halogen, $C_1$–$C_5$ alkoxy;

$X_1$ and $X_2$ mutually independently mean an anionic ligand from the group Cl,Br, $C_1$–$C_5$ carboxylate, phenoxy, $C_1$–$C_5$ alkoxy, $C_1$–$C_5$ alkylthio, which may optionally be substituted by $C_1$–C5 alkyl, halogen, $C_1$–C5 alkoxy or optionally by phenyl substituted by $C_1$–C5 alkyl, halogen, $C_1$–$C_5$ alkoxy;

$L_1$ and $L_2$ mutually independently mean a neutral ligand from the group aryl or $C_1$–$C_{10}$ alkylphosphines, which may optionally be substituted by $C_1$–$C_5$ alkyl, halogen, $C_1$–$C_5$ alkoxy or optionally by phenyl substituted by $C_1$–$C_5$ alkyl, halogen, $C_1$–$C_5$ alkoxy.

Preferred catalysts are the ruthenium/carbene complexes of the general formula (I) in which $R_1$ and $R_2$ mutually independently mean hydrogen, methyl. ethyl, phenyl, vinyl optionally substituted by methyl, ethyl or phenyl; $X_1$ and $X_2$ mutually independently mean Cl, Br; $L_1$ and $L_2$ mutually independently mean trimethylphosphine, triethylphosphine, triphenylphosphine or tricyclohexylphosphine.

Cyclic olefinic monomers which may be used are mono- or polycyclic monoolefins, diolefins, triolefins or tetraolefins, which may bear a range of polar functions, such as for example halogen, cyano, carboxylic acid ester, carboxylic acid amide, carboxylic anhydride, carboxylic acid imide, ether oxygen, carbonyl Croupy. Preferred monomers are polycyclic, ring-strained olefins having at least one norbornene substructure.

The monomers described above are compounds known in the literature of organic chemistry.

Particularly preferred monomers or comonomers are, for example:
2-norbornene,
5-methoxycarbonyl-2-norbornene,
5-methyl-5-methoxycarbonyl-2-norbornene,
5-cyano-2-norbornene,
5-methyl-5-cyano-2-norbornene,
5,5-dicyano-2-norbornene,
1,4,5,8-dimethano-1,4,4a,5,6,7,8,8a-octahydronaphthalene,
25 6-methyl-1,4,5,8-dimethano-1,4,4a,5,6,7,8,8a-octahydronaphthalene,
6-methyl-6-methoxycarbonyl-1,4,5,8-dimethano-1,4,4a,5,6,7,8,8a-octahydronaphthalene,
6-methyloxycarbonyl-1,4,5,8-dimethano-1,4,4a,5,6,7,8,8a-octahydronaphthalene,
6-cyano-1,4,5, 8-dimethano-1,4,4a,5,6,7,8,8a-octahydronaphthalene,
6-ethyl-1,4,5,8-dimethano-1,4,4a,5,6,7,8,8a-octahydronaphthalene,
6-ethylidene-1,4,5,8-dimethano-1,4,4a,5,6,7,8,8a-octahydronaphthalene,
6,7-dimethyl-1,4,5,8-dimethano-1,4,4a,5,6,7,8,8a-octahydronaphthalene, dicyclopentadiene,
tricyclopentadiene,
tetracyclopentadiene,
1,4-dimethano-1,4,4a,9a-tetrahydrofluorene.

Organic, protic or aqueous solvents which are inert under polymerisation conditions may be considered as the solvents for solution polymerisation. Examples are aromatic hydrocarbons, halogenated hydrocarbons, ethers, aliphatic hydrocarbons, alcohols, water or mixtures thereof Preferred examples are benzene, toluene, methylene chloride, dichloroethane, chlorobenzene, dichlorobenzene, diethyl ether, tetrahydrofuran, hexane and cyclohexane.

Polymerisation may be performed at temperatures of 0° C. to 100° C., preferably of 25° C. to 45° C.

Chain-transfer agents may be added to the polymerisation stage in order to adjust the molecular weight of the product. Suitable chain-transfer agents for ring-opening metathesis polymerisation are open-chain compounds having carbon-carbon double bonds. Examples of chain-transfer agents are $C_1$–$C_{12}$ alkenes, allyl acetate, allyl alkyl ethers, styrene, 1,4-dimethoxy-2-butene. The molecular weight of the product may be adjusted by varying the molar ratio of chain-transfer agent to monomer between 1:50 and 1:10000, preferably between 1:100 and 1:1000.

Alkyl vinyl ethers are used as optionally added modifiers to modify the catalysts. The alkyl vinyl ether converts the ruthenium-carbene complex into a ruthenium-alkoxycarbene complex, so dramatically reducing the rate of the metathesis reaction. The molar ratio of catalyst to modifier may vary between 1:1 and 1:100, preferably between 1l:1 and 1:10.

The molar ratio of catalyst to monomer may vary between 1:5 and 1:100000, preferably between 1:1000 and 1:50000.

The process according to the invention is preferably performed in the following manner: the monomers are usually dissolved in an inert solvent. The concentration of the monomers may be 5–60%, with concentrations of 5–30% being preferred. Chain-transfer agents are then apportioned, if required, and then the catalyst. The reaction proceeds without pronounced exothermic effect. The reaction time may range between a few minutes to some hours.

A modifier is then added, if required. The polymerisation solution is optionally diluted with the same solvent as during polymerisation or with another inert solvent to a concentration of 1–50%, preferably of 5%–30% and then hydrogenated in a high pressure autoclave. The hydrogenation time may be from 1–24 hours.

The hydrogenation product may be isolated using known methods, for example by precipitation from the polymer solution with a lower aliphatic alcohol or by introducing the polymer solution into hot water (stripping).

Polymerisation and hydrogenation may be performed both batch-wise and continuously, for example in a stirred tank cascade or in a reaction extruder.

The hydrogenated ROMP polymers according to the invention have a weight average molecular weight (determined by gel permeation chromatography with polystyrene calibration) of 5000 to 1000000, preferably of 5000 to 150000. Molecular weight is dependent upon processing parameters, in particular upon the monomer/catalyst ratio and the monomer/chain-transfer agent ratio and may be adjusted to desired values by varying these parameters.

The products from the process according to the invention have particularly low catalyst residue contents. Purification is no longer necessary for most applications. The traces of elements such as chlorine, ruthenium and phosphorus etc. may, if required, effectively be removed by bringing the hydrogenation products into contact with an aqueous solution of an organic/inorganic acid, such as for example formic acid, acetic acid, propionic acid and hydrochloric acid, or with an active solid absorbent, such as for example silica gel, diatomaceous earth, activated carbon or aluminium oxide.

In comparison with the prior art, the process according to the invention is in particular distinguished in that 1. it requires only one catalyst component,
2. it tolerates a range of polar solvents in monomers,
3. the resultant product has a particularly low metal residue content, such that a separate purification stage is not necessary for most applications.

The present invention is illustrated by the following Examples, but is not restricted to these Examples.

Examples

Example 1

Hydrogenated, ring-opened metathesis polymer prepared from 2-norbornene

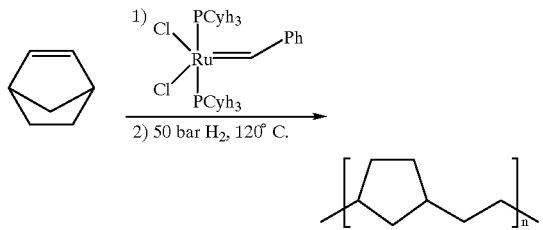

A solution of 4.7 g (50 mmol) of 2-norbornene, 58 mg (0.5 mmol) of 1,4-dimethoxy-cis-2-butene in 15 ml of toluene is added dropwise at room temperature under nitrogen to a mixture of 1 ml (0.01 mmol) of a 0.01M solution of bis(tricyclohexylphosphine)-benzylideneruthenium chloride in toluene and 10 ml of toluene. The reaction mixture is stirred for a further 3 hours and polymerisation is terminated with 0.2 ml of ethyl vinyl ether. The resultant viscous solution is diluted with 50 ml of toluene and hydrogenated for 12 hours at 120° C. under a hydrogen pressure of 50 bar. The reaction mixture is cooled to room temperature and the solution is added dropwise to methanol. After suction filtration and drying, 4.7 g of polymer are obtained. $_1$H– and $^{13}$C–NMR show that 90% of the olefinic double bonds are hydrogenated.

Example 2

Hydrogenated, ring-opened metathesis polymer prepared from 7-methyl-7-methoxy-carbonyltetracyclododecene

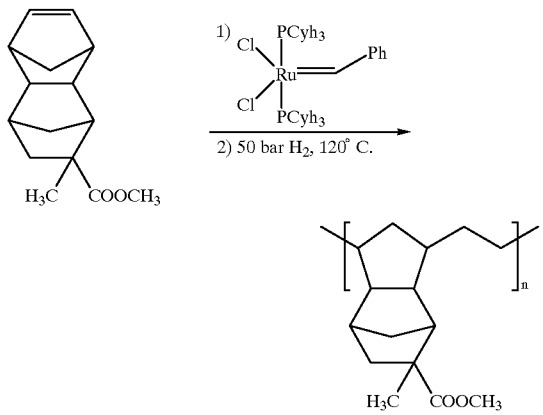

A solution of 27.8 g (120 mmol) of 7-methyl-7-methoxycarbonyltetracyclododecene, 14 mg (0.6 mmol) of 1-hexene in 100 ml of tetrahydrofuran is added dropwise at room temperature under nitrogen to a solution of 33 mg( (0.04 mmol) of bis(tricyclo-hexylphosphine) benzylideneruthenium chloride in 30 ml of tetrahydrofuran. The reaction mixture is stirred for a further 3 hours and polymerisation is terminated with 0.2 ml of ethyl vinyl ether. The resultant viscous solution is diluted with 500 ml of tetrahydrofuran and hydrogenated for 12 hours at 120° C. under a hydrogen pressure of 50 bar. The reaction mixture is cooled to room temperature and the solution is added dropwise to methanol. After suction filtration and drying, 26 g of polymer are obtained having a weight average molecular weight of 96700 and a number average molecular weight of 41500 (measured by gel permeation chromatography with polystyrene calibration). $^1$H— and $^{13°}$ C—NMR show that 96% of the olefinic double bonds are hydrogenated.

Example 3

Hydrogenated, ring-opened metathesis polymer prepared from 7-ethylidenetetracyclo-dodecene

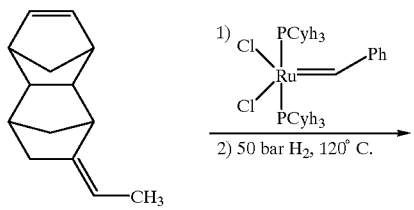

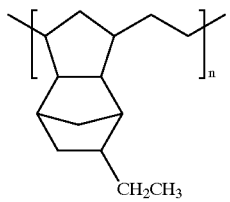

A solution of 4.52 g (24.3 mmol) of 7-ethylidenetetracyclododecene, 11 mg (0.12 mmol) of ally ethyl ether in 5 ml of toluene is added dropwise at room temperature under nitrogen to a solution 20 mg (0.024 mmol) of bis(tricyclohexylphosphine)-benzylideneruthenium chloride in 30 ml of toluene. The reaction mixture is stirred for a further 3 hours and polymerisation is terminated with 0.2 ml of ethyl vinyl ether. The resultant viscous solution is diluted with 200 ml of toluene and hydrogenated for 12 hours at 120° C. under a hydrogen pressure of 50 bar. The reaction mixture is cooled to room temperature and the solution is added dropwise to methanol. After suction filtration and drying, 4.3 g of polymer are obtained having a weight average molecular weight of 122000 and a number average molecular weight of 48100 (measured by gel permeation chromatography with polystyrene calibration). $^1$H— and $^{13}$C-NMR show that more than 98% of the olefinic double bonds are hydrogenated.

The crude product is purified by dissolving it in xylene, combining the solution with 20 g of diatomaceous earth, stirring the suspension for 30 minutes with refluxing, suction filtering, the warm suspension and reprecipitating the polymer in methanol.

Comparative Example 1

Hydrogenated, ring-opened metathesis polymer prepared from 7-ethylidenetetracyclododecene (1) 3.8 ml (3.8 mmol) of 1 M solution of triethylaluminium, 1.4 ml (10 mmol) of triethylamine and 1.0 ml (1.0 mmol) of a 1 M solution of titanium tetrachloride in toluene are added in the stated sequence to a mixture of 22.3 g (120 mmol) of 7-ethylidenetetracyclododecene, 2 ml (1 mmol) of a 0.5M solution of 1-hexene in toluene and 110 ml of toluene. The reaction mixture is stirred for a further 3 hours and polymerisation is terminated with 1 ml of methanol. The resultant viscous solution is added dropwise to methanol. The precipitated product is removed by suction filtration and dried under a vacuum. 22 g of polymer are obtained having a weight average molecular weight of 79700 and a number average molecular (2) 22 g of the product obtained from stage (1) are dissolved in 200 ml of toluene in a high pressure autoclave. The autoclave is provided with an inert nitrogen atmosphere. 50 mg of RuH$_2$(CO)(PPh$_3$)$_3$ are added and the mixture is 20 hydrogenated for 12 hours at 120° C. under a hydrogen pressure of 50 bar. The reaction mixture is cooled to room temperature and the solution is added dropwise to methanol. After suction filtration and drying, 21.4 g of polymer are obtained. $^1$H— and $^{13}$C—NMR show that more than 98% of the olefinic double bonds are hydrogenated.

Example 4

Hydrogenated, ring-opened metathesis copolymer prepared from 5-cyano-2-norbornene with tetracyclododecene (molar ratio 40:60)

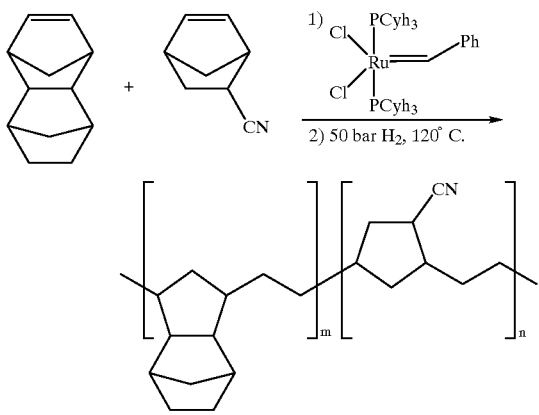

A solution of 1.9 g (16 mmol) of 5-cyano-2-norbornene and 3.84 g (24 mmol) of tetracyclododecene in 5 ml of toluene are added dropwise at room temperature under nitrogen to a solution of 33 mg (0.04 mmol) of bis (tricyclohexylphosphine)benzylidene ruthenium chloride in 25 ml of toluene. The reaction mixture is stirred for a further 6 hours and polymerisation terminated with 0.2 ml of ethyl vinyl ether. The resultant viscous solution is diluted with 200 ml of toluene and hydrogenated for 12 hours at 120° C. under a hydrogen pressure of 50 bar. The reaction mixture is cooled to room temperature and the solution is added dropwise to methanol. After suction filtration and drying, 4.8 g of polymer are obtained having a weight average molecular weight of 33700 and a number average molecular weight of 9100 (measured by gel permeation chromatography with polystyrene calibration). $^1$H— and $^{13}$C—NMR show that more than 98% of the olefinic double bonds are hydrogenated and the cyano groups are retained.

Comparative Example 2

Hydrogenated, ring-opened metathesis copolymer prepared from 5-cyano-2-norbornene with tetracyclododecene (molar ratio 40:60)

(1) 3.97 g (10 mmol) of tungsten(VI) chloride are dissolved in 70 ml of toluene under nitrogen. A solution of 2.36 g (20 mmol) of acetaldehyde/diethyl acetal in 30 ml of toluene is added dropwise to this solution at 20–25° C. with stirring. The hydrogen chloride so formed is purged with a dry stream of nitrogen within 3 hours. The tungsten concentration in the resultant solution is approx. 0.1 mol/L.

(2) 3.3 ml (0.33 mmol) of the catalyst solution obtained in stage (1) and 1.3 ml (2.3 mmol) of a 1.8M solution of diethylaluminium chloride in toluene are added to a mixture of 4.76 g (40 mmol) of 5-cyanonorbornene, 2 ml (1mmol) of a 0.5M solution of allyl ethyl ether in methylene chloride and 80 ml of tetrahydrofuran. A solution of 9.6 g (60 mmol) of tetracyclododecene in 40 ml of tetrahydrofuran is then added dropwise within 2 hours. The reaction mixture is stirred for a further 3 hours and the polymerisation terminated with 1 ml of methanol. The resultant viscous solution contains approx. 12 g of polymer per 100 ml and may be used for hydrogenation. The solution is added dropwise to methanol in order to isolate the polymer. The precipitated product is removed by suction filtration and dried under a vacuum. 13.7 g of a polymer are obtained having a weight average molecular weight of 30800 and a number average molecular weight of 12600 (measured by gel permeation chromatography with polystyrene calibration).

(3) The solution obtained in stage (2) (approx. 120 ml) is introduced into a high pressure autoclave with a magnetic stirrer. The autoclave is provided with an inert nitrogen atmosphere. 50 mg of RuHCl(CO)(P(C$_6$H$_5$)$_3$)$_3$ are added and hydrogen introduced. The temperature is raised to 120° C. with stirring. At this temperature, the pressure is 50 bar. The reaction mixture is stirred at this temperature for 10 hours. The mixture is cooled to room temperature and the solution added dropwise to methanol. 12.5 g of polymer are obtained after suction filtration and drying. $^1$H— and $^{13}$C—NMR show that more than 98% of the olefinic double bonds are hydrogenated and the cyano groups are retained.

We claim:

1. A process for the production of hydrogenated, ring-opened metathesis (co)polymers from cyclic olefins using the ruthenium-carbene complexes of the general formula (I)

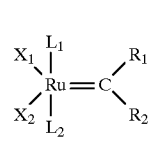

(I)

in which

R$_1$ and R$_2$ mutually independently mean hydrogen, C$_2$–C$_{20}$ alkenyl, C$_1$–C$_{20}$ alkyl, aryl, C$_1$–C$_{20}$ carboxylate, C$_1$C$_{20}$ alkoxy, C$_2$–C$_{20}$ alkenyloxy, aryloxy, C$_2$–C$_{20}$ alkoxycarbonyl, C$_1$–C$_{20}$ alkylthio, which may optionally be substituted by C$_1$–C$_5$ alkyl, halogen, C$_1$–C$_5$ alkoxy or by phenyl optionally substituted by C$_1$–C$_5$ alkyl, halogen, C$_1$–C$_5$ alkoxy;

X$_1$ and X$_2$ mutually independently mean any desired anionic ligand;

L$_1$ and L$_2$ mutually independently mean any desired neutral electron donor and two or three of X$_1$, X$_2$, L$_1$ and L$_2$ may furthermore together form a multidentate chelating ligand, as catalysts for the polymerisation stage, wherein the catalyst is optionally modified after polymerisation by adding a modifier and the polymerisation product is hydrogenated as a solution (optionally diluted with the same inert solvent as during polymerisation or with another inert solvent) without addition of an extra hydrogenation catalyst at temperatures of 0° C. to 200° C. under a hydrogen pressure of 2 to 200 bar and wherein at least 60% of the olefinic double bonds are saturated.

2. The process of claim 1, wherein the catalysts used are the ruthenium-carbene complexes of the general formula (I), in which R$_1$ and R$_2$ mutually independently mean hydrogen, methyl, ethyl, phenyl, vinyl optionally substituted by methyl, ethyl or phenyl; X$_1$ and X$_2$ mutually independently mean Cl, Br; L$_1$ and L$_2$ mutually independently mean trimethylphosphine, triethylphosphine, triphenylphosphine or tricyclohexylphosphine.

3. The process of claim 1, wherein the monomers used are polycyclic, ring-strained olefins having at least one norbornene sub-structure and may bear halogen, cyano, carboxylic acid ester, carboxylic acid amide, carboxylic anhydride, carboxylic acid imide, ether oxygen or carbonyl groups.

4. The process of claim 1, wherein the monomer or monomer combination used is selected from 2-norbornene,
5-methoxycarbonyl-2-norbornene,
5-methyl-5-methoxycarbonyl-2-norbornene,
5-cyano-2-norbornene,
5-methyl-5-cyano-2-norbornene,
5,5-dicyano-2-norbornene,
1,4,5,8-dimethano-1,4,4a,5,6,7,8,8a-octahydronaphthalene,
6-methyl-1,4,5,8-dimethano-1,4,4a,5,6,7,8,8a-octahydronaphthalene,
6-methyl-6-methoxycarbonyl-1,4,5,8-dimethano-1,4,4a,5,6,7,8,8a-octahydro-naphthalene,
6-methyloxycarbonyl-1,4,5,8-dimethano-1,4,4a,5,6,7,8,8a-octahydronaphthalene,
6-cyano-1,4,5,8-dimethano-1,4,4a,5,6,7,8,8a-octahydronaphthalene,
6-ethyl-1,4,5,8-dimethano-1,4,4a,5,6,7,8,8a-octahydronaphthalene,
6-ethylidene-1,4,5,8-dimethano-1,4,4a,5,6,7,8,8a-octahydronaphthalene,
6,7-dimethyl-1,4,5,8-dimethano-1,4,4a,5,6,7,8,8a-octahydronaphthalene, dicyclopentadiene,
tricyclopentadiene,
tetracyclopentadiene,
1,4-dimethano-1,4,4a,9a-tetrahydrofluorene.

5. The process of claim 1, wherein at least 95% of the olefinic double bonds are saturated.

* * * * *

UNITED STATES PATENT AND TRADEMARK OFFICE
CERTIFICATE OF CORRECTION

PATENT NUMBER: 5,932,664

DATED: August 3, 1999

INVENTOR(S): Yun Chen, Ralf Dujardin, Harald Pielartzik and Uli Werner Franz

It is certified that several errors appear in the above-identified patent and that said Letters Patent is hereby corrected as shown below:

On the cover page, in section [57], Abstract, in the third line of the definition of $L_1$ and $L_2$, "$X_2$, $L_1$ and $L_2$" should be - -$X_2$, $L_1$ and $L_2$- -.

In column 1, at line 67 (last line) the word "alky" should be - -alkyl- -.

In column 2, at line 3, "$C_1$-$C_5$" should be - - $C_1$-$C_5$- -.

In claim 1, at column 8, line 32, "$C_1C_{20}$ alkoxy" should read - - $C_1$-$C_{20}$ alkoxy - -.

Signed and Sealed this

Tenth Day of April, 2001

Attest:

NICHOLAS P. GODICI

*Attesting Officer*     *Acting Director of the United States Patent and Trademark Office*